No. 786,771. Patented April 4, 1905.

UNITED STATES PATENT OFFICE.

VALENTIN LAPP, OF LEIPSIC, GERMANY.

PROCESS OF MANUFACTURING NON-ALCOHOLIC BEER.

SPECIFICATION forming part of Letters Patent No. 786,771, dated April 4, 1905.

Application filed May 15, 1901. Serial No. 60,359.

*To all whom it may concern:*

Be it known that I, VALENTIN LAPP, a subject of the King of Saxony, residing at No. 2 Georgiring, Leipsic, in the Kingdom of Saxony, German Empire, have invented a new and Improved Process of Manufacturing Non-Alcoholic Beer, of which the following is a specification.

This invention consists in a process by means of which is produced non-alcoholic beer.

The product of this invention differs from so-called "non-alcoholic beers" heretofore produced in that the wort is actually subjected to a fermentation process for a certain period of time, the action being interrupted before the formation of alcohol. This is accomplished by maintaining the wort after the addition of the yeast at a low temperature approximating 0° centigrade, whereby the action of the yeast is retarded, the more difficultly-diffusible albuminous constituents remaining unaffected. The yeast is removed before the development of alcohol can take place.

The process is preferably carried out as follows: Wort manufactured according to any of the well-known brewing processes is provided in the fermenting-cellar with yeast at a temperature approximating 0° centigrade. In practice it has been found advisable to use proportions of from five to six liters of bottom-yeast to thirty hectoliters of wort, which shows, according to Balling's tables, in connection with the Balling saccharometer, the presence of 12.5 to fifteen per cent. of extract. The yeast employed is preferably pure *Saccharomyces cervisiæ*. The yeast is washed in sterilized water and then permitted to stand in water, whereupon it separates into one portion sinking to the bottom and into another rising to the surface. Only the first-mentioned portion should be used. The yeast is then aerated in any apparatus known for this purpose, whereupon it is added to the wort and thoroughly mixed with the same by stirring. The mixture of wort and yeast is then maintained at a temperature of approximately 0° centigrade by means of refrigerating-coils or in any other approved manner during the continuance of the process. Preferably the vessel containing the wort is tightly closed in order to shut off the access of oxygen for the purpose of still further retarding the action of the yeast. Because of the low temperature, just above the freezing-point, of the wort and also because of the lack of oxygen the generative power of the yeast is so considerably diminished that it acts only to absorb and assimilate the easily-diffusible nitrogenous bodies, while the more difficultly-diffusible albuminous bodies present in the wort remain unchanged. After some time, varying from twenty-four to forty-eight hours, or usually about thirty-six hours, the wort becomes turbid. This is an indication that the yeast is about to sprout and the generation of alcohol and carbonic acid about to begin. The time within which the turbidity of the wort ensues depends upon peculiarities in the wort and the yeast and should be ascertained by tests when carrying out the process. This may be easily done by taking samples from the wort and subjecting them to a microscopic examination, when an expert will be able to determine whether or not the yeast has commenced to sprout. Another test is available—viz., measuring the strength of the wort by means of Balling's saccharometer. The strength should be reduced by the treatment by an amount varying between .1 to .4 per cent., usually about .2 or .3 per cent. It follows therefore that in case of wort having before treatment a strength of, say, 12.75 per cent., the strength after treatment should be 12.5 per cent. As soon as it has been determined by the indications above described that the yeast is about to begin to sprout the yeast is separated from the beer and the latter is clarified by filtration, carbonated in the well-known manner, and again filtered. The product is a true beer, which is, however, devoid of alcohol because the fermentation has been interrupted at a definite time previous to the formation of alcohol.

It is important that the step of filtration should be carefully carried out in order that the taste and flavor of the beer be not impaired by the bodies remaining within the same. It is consequently desirable that the first filtration be in a comparatively coarse apparatus in order to remove the large bodies, and that the second be such as to remove the remaining solid matter. The carbonation of the beer preferably takes place previous to the last filtration.

Having thus fully described my invention, what I claim as new, and desire to secure by Letters Patent, is—

1. The method of manufacturing non-alcoholic beer, which consists in adding yeast to wort and maintaining the mixture at a temperature below that at which the yeast will act upon the more difficultly-diffusible albuminous constituents of the wort, removing the yeast when it begins to sprout, and clarifying the liquor thus obtained.

2. The method of manufacturing non-alcoholic beer, which consists in adding yeast to wort and maintaining the mixture at a temperature at which the yeast will act upon some of the peptones and amids but will not act upon the more difficultly-diffusible albuminous constituents of the wort, removing the yeast when it begins to sprout, and clarifying the liquor thus obtained.

3. The method of manufacturing non-alcoholic beer, which consists in adding yeast to wort at a low temperature, maintaining said low temperature during the action of the yeast, removing the yeast from the wort before it commences to sprout, and carbonating the liquor thus obtained.

4. The method of manufacturing non-alcoholic beer, which consists in adding yeast to wort at a temperature approximating 0° centigrade, maintaining said low temperature during the action of the yeast, separating the yeast from the wort before it commences to sprout, and carbonating the liquor thus obtained.

5. The method of manufacturing non-alcoholic beer, which consists in adding yeast to wort at a temperature approximating 0° centigrade, maintaining said low temperature during the action of the yeast, removing the yeast from the wort before it commences to sprout, and clarifying and carbonating the liquor thus obtained.

6. The method of manufacturing non-alcoholic beer, which consists in adding yeast to wort at a low temperature, maintaining the wort and yeast at such low temperature under exclusion of air during the action of the yeast, removing the yeast from the wort by filtration before it commences to sprout, and clarifying and carbonating the liquor thus obtained.

7. The method of manufacturing non-alcoholic beer, which consists in adding yeast to wort at a low temperature approximating 0° centigrade, maintaining the wort and yeast at such low temperature under exclusion of air during the action of the yeast, removing the yeast from the wort by filtration before it commences to sprout, and clarifying and carbonating the liquor thus obtained.

8. The method of manufacturing non-alcoholic beer, which consists in adding yeast to wort at a temperature approximating 0° centigrade, maintaining the wort and yeast at such low temperature during the action of the yeast, removing the yeast from the wort when it becomes turbid, and clarifying and carbonating the liquor thus obtained.

9. The method of manufacturing non-alcoholic beer, which consists in adding yeast to wort at a temperature approximating 0° centigrade, permitting the yeast to act upon the wort at such temperature until the strength of the wort is reduced from .1 to .4 per cent., then removing the yeast, and clarifying and carbonating the liquor thus obtained.

10. The method of manufacturing non-alcoholic beer, which consists in adding yeast to wort at a low temperature, maintaining the wort and yeast at such low temperature under exclusion of air until the strength of the wort is reduced from .1 to .4 per cent., removing the yeast, and clarifying and carbonating the liquor thus obtained.

11. The method of manufacturing non-alcoholic beer, which consists in adding five to six liters of yeast to approximately thirty hectoliters of wort, and maintaining the same at a temperature of approximately 0° centigrade until turbidity ensues, removing the yeast about the time it commences to sprout, and clarifying and carbonating the liquor thus obtained.

12. The method of manufacturing non-alcoholic beer, which consists in adding five to six liters of bottom-yeast to approximately thirty hectoliters of wort, showing twelve to fifteen per cent. of extract, maintaining under exclusion of air the mixture at a temperature of approximately 0° centigrade until turbidity ensues and the strength of the wort is reduced from .1 to .4 per cent., then removing the yeast, filtering and carbonating the liquor thus obtained.

In witness whereof I have hereunto set my hand in presence of two witnesses.

VALENTIN LAPP.

Witnesses:
OTTO NAUMANN,
RUDOLPH FRICKE.